United States Patent
Rochefort et al.

(10) Patent No.: US 9,896,559 B2
(45) Date of Patent: Feb. 20, 2018

(54) PHENOLIC FOAM (71) Applicant: Kingspan Holdings (IRL) Limited, Kingscourt (IE)

(72) Inventors: Malcolm Rochefort, Starkes Ludlow (GB); Lynne Ripley, North Yorkshire (GB); Philip Holland, Huddersfield Yorkshire (GB); Vincent Coppock, Cheshire (GB)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 88 days.

(21) Appl. No.: 14/429,044

(22) PCT Filed: Sep. 18, 2013

(86) PCT No.: PCT/EP2013/069391
§ 371 (c)(1),
(2) Date: Mar. 18, 2015

(87) PCT Pub. No.: WO2014/044715
PCT Pub. Date: Mar. 27, 2014

(65) Prior Publication Data
US 2015/0225528 A1 Aug. 13, 2015

(30) Foreign Application Priority Data

Sep. 18, 2012 (EP) .................... 12184818
Sep. 18, 2012 (IE) .................... 2012/0408
Dec. 21, 2012 (GB) .................... 1223270.8

(51) Int. Cl.
*C08J 9/00* (2006.01)
*C08J 9/14* (2006.01)

(52) U.S. Cl.
CPC ............. *C08J 9/148* (2013.01); *C08J 9/0066* (2013.01); *C08J 9/141* (2013.01); *C08J 9/149* (2013.01); *C08J 2201/022* (2013.01); *C08J 2201/026* (2013.01); *C08J 2203/14* (2013.01); *C08J 2203/142* (2013.01); *C08J 2203/144* (2013.01); *C08J 2203/182* (2013.01); *C08J 2203/202* (2013.01); *C08J 2205/052* (2013.01); *C08J 2361/10* (2013.01); *C08J 2373/00* (2013.01)

(58) Field of Classification Search
CPC . C08J 9/0066; C08J 9/141; C08J 9/148; C08J 9/149; C08J 2201/022; C08J 2201/026; C08J 2203/14; C08J 2203/142; C08J 2203/144; C08J 2203/182; C08J 2203/202; C08J 2205/052; C08J 2361/10; C08J 2373/00
See application file for complete search history.

(56) References Cited

U.S. PATENT DOCUMENTS

| | | | |
|---|---|---|---|
| 4,057,519 A | 11/1977 | Summers et al. | |
| 4,067,829 A * | 1/1978 | Garrett | C08J 9/0066 521/181 |
| 5,057,546 A * | 10/1991 | Sudan | C08J 9/141 264/321 |
| 5,489,619 A * | 2/1996 | Barcroft | C08J 9/149 252/182.2 |
| 2003/0216847 A1 | 11/2003 | Bellinger | |
| 2007/0265362 A1 | 11/2007 | Coppock | |
| 2011/0124257 A1* | 5/2011 | Coppock | C08J 9/0066 442/370 |
| 2013/0015389 A1* | 1/2013 | Torres-Aranda, Jr. | C08J 9/32 252/62 |

FOREIGN PATENT DOCUMENTS

| | | |
|---|---|---|
| EP | 0170357 A1 | 2/1986 |
| FR | 2157674 A1 | 6/1973 |
| GB | 1351476 A | 5/1974 |

OTHER PUBLICATIONS

Metso Sodium Metasilicates, PQ Corporation, 2009.*

* cited by examiner

*Primary Examiner* — Irina S Zemel
(74) *Attorney, Agent, or Firm* — Harness, Dickey & Pierce, P.L.C.

(57) ABSTRACT

Phenolic closed-cell foam comprises a hydrocarbon blowing agent and includes an alkali metal silicate in an amount of at least 1% by weight. The foam has an aged thermal conductivity as determined by the procedures of EN13166: 2008 of less than 0.025 W/m·K. The foam is formed from a phenolic resole resin mixture having a water content of greater than 15% by weight but less than 24% by weight.

19 Claims, 2 Drawing Sheets

PHENOLIC FOAM

BACKGROUND OF THE INVENTION

Historically, phenolic resins have been the preferred thermosetting resin material when low smoke emission and self-extinguishing ability are of paramount importance in a fire situation. Applications are in building, heating, ventilation, and pipe insulation where phenolic foams provide both thermal insulation and fire resistance.

Presently, in phenolic cellular foam manufacture, a phenolic resin such as a resole resin is commonly catalysed by either a strong organic or inorganic acid. For example, EP 0 170 357A describes a process for the production of an acid cured phenolic resin foam. The selection of acid type is dependent on the desired curing time and temperature. Cellular insulation foam is produced when the blowing agent that has been blended into the resin starts to boil. Hydrocarbons or mixtures thereof are commonly used blowing agents. Expansion typically occurs in the temperature range 15° C. to 70° C. Care needs to be taken in the manufacture of phenolic foam to ensure that an excessive resin exotherm does not develop. If the total % water content in the formulated resin system is too low, the occurrence of an uncontrolled exothermic chemical reaction is more likely for example when a strong acid is used as catalyst. When exothermic reactions develop, further amounts of water or steam are created by the phenolic resin condensation polymerisation reaction. This adversely affects the ability to form closed cell foam. Similarly, if the selected phenolic resin has too high a water content, closed cell foam will not be produced. Closed cell foam structure is highly desirable to maximise insulation performance. By controlling the % water content of the uncured phenolic resin system, prior to activating curing and the blowing agent, and curing at elevated temperatures it is possible to produce phenolic foam that has a closed cell structure. It is also necessary to select the type and amount of each of the phenolic resin; acid catalyst; surfactant and blowing agent, for mixing and curing at elevated temperature to achieve the desired closed cell foam.

Electron microscopy can be used to demonstrate whether foam cells have defects such as holes or cracks. It is desirable to have low density, defect free, closed cell foam for low cost, stable thermal insulation. Defects in cells can lead to a loss of chemical blowing agent from the cells and air diffusing into the cells raising thermal conductivity. This is undesirable for an insulation material.

In particular, there is a need to provide low-density closed cell phenolic foams without holes or cracks in the cells. Further, there is a need for a phenolic resin system that can be easily mixed at moderate temperatures (10 to 30° C.). Low viscosity resin systems are preferred for ease of mixing in manufacturing on a commercial basis.

Phenolic foam can be prepared in blocks, laminated boards or as moulded sections of a particular shape. In one industrial process, laminated phenolic foam insulation boards are manufactured with typical thickness 20 mm to 150 mm and a dry density of 25 to 60 kg/m$^3$. In this process, phenolic resin, acid, and blowing agent are mixed using a conventional high shear or high pressure mixer head. The catalysed liquid resin is then introduced into a foam laminating machine and progressed between aluminium foil, steel plates, paper or glass mat facings. Foaming and curing then commences and the resin cures to form a foam product. These foam products, that include for example insulation boards, are typically produced at 50 to 80° C. in about 2 to 15 minutes. The foam products then often require further cure, typically at elevated temperatures such as by what is often referred to as an oven "post cure", for example at 50 to 90° C., for 1 to 72 hours, to develop sufficient handling strength. The resin system typically comprises the following chemical ingredients listed with typical weight proportions parts by weight (pbw):

Liquid phenolic resole resin (typically 60-85% cured solids) containing 1 to 10% surfactant: 100 pbw Blowing agent (typically halocarbon and/or hydrocarbon based): 4-20 pbw Strong organic or mineral acid 9-30 pbw.

When phenolic foam products such as insulation boards are first manufactured, thermal conductivity ($\lambda$ value) at 23° C. is typically 0.017-0.024 W/m·K depending on the blowing agent selected. Such low thermal conductivity values are typical of a closed cellular structure which retains the blowing agent, and thus are indicative of substantially fewer cellular defects. Cell size is typically 30-200 μm. For effective insulation, foam products, including laminated foam products such as boards, are required to have low thermal conductivity stability ($\lambda$ value) for a long time. To prove long-term low thermal conductivity stability at room temperature, samples of foam products such as boards can be thermally aged, for example at 70° C. or 110° C. for an extended time period following the procedures in European Standard EN 13166:2008 (or EN 14314:2009). If the $\lambda$ value is low and stable after such accelerated thermal ageing, it is then reasonable to assume that the foam products such as the insulation boards, that show such low and stable values will provide long-term low thermal conductivity in service.

In the manufacture of acid cured phenolic foam, the manufacturing conditions used must be carefully controlled if a closed cell structure is to be achieved. If stringent procedures are not followed, initial $\lambda$ values can be as high as 0.030 to 0.040 W/m·K for 25 to 60 kg/m$^3$ density foam; indicating loss of closed cell integrity and ingress of air into the cells. The type and amount of catalyst used in phenolic foam manufacture has a profound effect on the long-term stability of the foam cells. Increased acid catalyst levels tend to result in foam with high initial $\lambda$ values, and/or foam in which the $\lambda$ value increases unacceptably with time.

There is a requirement in the construction industry for a phenolic insulation foam that shows not only good initial thermal conductivity properties but also retains those properties when aged. This means that the product not only exhibits good insulative properties when first installed but also exhibits relatively good insulative properties over its lifetime, which may be many decades.

Many attempts have been made to impart good aged insulative properties to foams. These include adding various surfactants to improve foam foaming and foam stability, plasticisers to impart flexibility to the foam thus avoiding cracking within the foam, utilising different types of filler, varying the blowing agent utilised, varying process parameters such as temperature and degree of catalysis. Despite this, some commercially available phenolic foams sold for the construction market, heating and ventilation applications, and industrial purposes do not show good long term retention of thermal conductivity.

On the other hand other properties of foams or the resins used to form them have been addressed. For example UK Patent No. GB1351476 deals with a number of problems. It is firstly concerned with the physical properties of the uncured resin and in particular producing resin compositions that are flowable so that they can be easily pumped into cavities between walls and cured in-situ. Fillers are said to impede the flow of the foam into the hollow spaces. To address this issue the composition is formulated as an aqueous foamable phenolic resin that comprises a phenol-aldehyde condensate, a particulate mineral filler, "waterglass" and an expanding agent. This patent is concerned with providing resins that show good flowability so that the resin can be introduced into the space between cavity walls and also providing resins with non-flammable properties. Accordingly its teaching is about having a formulation that on the one hand does not have too much filler so that flowable properties are satisfactory, and on the other hand compensating for any reduction in filler, as reducing the amount of filler deleteriously affects the flammability properties of the material formed from the compositions.

"Waterglass" is defined in the patent as being sodium and/or potassium silicate. The "EXAMPLE" and the "COMPARATIVE TEST" appears to show that the waterglass content has the "surprising effect" of increasing flame resistance. The waterglass is thus used as a water-based inert filler that is substituted for particulate filler within the composition in order to strike the balance between the flowability of the resin and the resultant, flammability properties of the cured foam.

The present invention is concerned with a different problem, that is, achieving low thermal conductivity and in particular achieving low long term aged thermal conductivity (as defined in EN 13166:2008 or EN 14314:2009).

French Patent Publication FR 2,157,674 describes adding sodium silicate to phenol. The sodium silicate de-protonates the phenol in an acid base reaction with consumption of the sodium silicate.

US 2003/0216847 describes a closed-cell foam made from a novel cross-linked novolac-epoxy resin to which, in common with GB1351476 discussed above, sodium silicate is added as a flame retardant material.

SUMMARY OF THE INVENTION

According to the invention there is provided a phenolic foam comprising
a phenolic resin, such as a phenolic resole resin,
a catalyst such as an acid catalyst,
a blowing agent such as hydrocarbon, and including
alkali metal silicate in an amount of at least 1% by weight of the foam
the foam having an aged thermal conductivity as determined by the procedures of EN13166:2008 of less than 0.025 W/m·K.

It is beneficial to provide a foam product which exhibits such low aged thermal conductivity values. It is thought that with the present invention it is also possible to provide foam products with an aged thermal conductivity as determined by the procedures of EN13166:2008 or EN 14314:2009 of less than 0.020 W/m·K.

The % weight of silicate in the resin mixture as compared to the amount, in the foam does not vary to any substantial extent. Any difference is due largely to loss of some water in the foam drying process.

A suitable surfactant can be employed to ensure good closed cell formation and integrity. Suitable surfactants include those selected from the group: alkyl phenol ethoxylates, triglyceride ethoxylates, and certain silicones and combinations thereof. The surfactant is desirably present in an amount of 2 to 7% by weight of the foam.

The foam product formed does not lose its expanded form to any substantial extent after it is formed. For example the foam product will be free standing after it has been formed.

It has been found that with compositions such as those from GB1351476 will not have a desirable closed cell structure such as that achievable with the foam of the present invention.

Furthermore the foam products of the present invention have sufficient structural integrity to allow them to be handled after initial cure and before any secondary curing, (secondary curing may be for example by heating). They are typically non-flowable having the consistency of a solid. In contrast it has been found that the product formed from GB1351476 does not have sufficient handling strength to allow it to be handled in any way for further processing.

In many applications of the foam products of the present invention they must be sufficiently rigid to allow them to be produced in a desired shape. For example they may be produced as a hoard, panel, curved sections for example c-shape sections for pipe insulation etc.

The foam is desirably formed from a phenolic resin mixture having a water content of from about 12 to 24% such as about 13 to about 24% for example about 15 to about 24% suitably about 15 to about 21% by weight of the resin mixture.

Water in the amounts mentioned may employed in phenolic resin, such as a resole resin, to reduce the viscosity for ease of liquid handling and to facilitate mixing during the foam processing reaction. However even with the overall water content in the range set out above the present invention provides foam products which show very desirable aged thermal conductivity despite the fact that such water content would usually impact deleteriously on the aged thermal conductivity.

In contrast GB1351476 describes an example of high % water content phenolic resin system used to make phenolic foam. The example in GB1351476, Page 2 Lines 88 to 110 describes using phenolic resin with 27% to 30% water content. Further, the acid catalyst used is a 50% aqueous solution of toluene sulphonic acid which adds to the overall water content in the resin system, GB 1351476 also describes the addition of 45 to 50% aqueous sodium silicate solution, (sodium waterglass) as an aid to improving fire properties. It is clear to the person skilled in the art that the addition of aqueous acid and sodium silicate solution to the phenolic resin raises the overall water content of the total formulated resin system comprising phenolic resin, alkali metal silicate, blowing agent, and acid catalyst to between 36.3% and 38.3% by weight. In this calculation fillers such as vermiculite fillers are excluded. This conclusion is based on calculating the total water content before curing and foaming as described at page 2, lines 87 to 102 of that document.

For the purposes of the present invention when calculating the % weight of water present, the only component that is ignored for the purposes of the calculation is any filler that is present. Fillers are optional, but even if present, they are excluded from the % water calculation. For comparative purposes, for example for comparison with GB 1351476, the calculation is done on the same basis, that is by excluding the filler.

As shown by the present inventors using a high water content phenolic resole resins and/or high water content acid can often lead to foam cell structures with excessive holes in the cell walls. These holes are most easily observed using scanning electron microscopy (SEM). Holes in cell walls lead to loss of blowing agent with time leading to relatively high long term thermal conductivity, above 0.025 W/m·K and, typically in excess of 0.030 W/m·K.

The alkali metal silicate is used in an amount sufficient to impart the desired aged thermal conductivity.

The alkali metal silicate may be present in an amount of from 1% to 10% by weight, of the phenolic foam.

In some embodiments the alkali metal silicate is present in an amount of from 2.5% to 5% by weight of the phenolic foam.

The alkali metal silicate may be hydrated and have the formula $A_2SiO_3.nH_2O$ in which A is an alkali metal from Group 1 of the Periodic Table and n is an integer from 1 to 9.

In some embodiments the alkali metal silicate is selected from one or more of the group comprising sodium silicate, potassium silicate and lithium silicate.

In one case the silicate is sodium silicate pentahydrate. In another case the silicate is potassium silicate. In a further case the silicate is lithium silicate.

The hydrocarbon may comprise a mixture of hydrocarbons.

In one embodiment the hydrocarbon blowing agent comprises at least one pentane.

The hydrocarbon may comprise a mixture of cyclopentane and isopentane.

In another case the hydrocarbon comprises a mixture of isopropyl chloride and isopentane.

In some embodiments the hydrocarbon comprises perfluoroalkane.

In a particularly preferred embodiment of the invention, the foam is formed from an acid catalysed phenolic resole resin mixture including surfactant and blowing agent and having a water content of from about 15% to about 24% by weight such as greater than 15% by weight but less than 24% by weight and the alkali metal silicate is present in the mixture (excluding optional fillers) so that the foam produced from said mixture comprises an amount of at least 1% by weight of the alkali metal silicate.

In one case the alkali metal silicate is present in the acid catalysed phenolic resole mixture so that the foam subsequently produced contains an amount of from 1% to 10% by weight.

In some embodiments the alkali metal silicate is present in the acid catalysed phenolic resole resin mixture so that the foam subsequently produced contains (excluding fillers) the alkali metal silicate in an amount of from 2.5% to 5% by weight.

Surprisingly, it has been discovered that it is possible to make hydrocarbon blown closed cell phenolic foam with stable low thermal conductivity, below 0.025 W/m·K, even after accelerated thermal ageing. The foam is prepared using a formulated phenolic resin system, (which includes phenolic resole resin, surfactant, acid catalyst, alkali metal silicate, blowing agent and optional fillers. This formulated phenolic resin system has a water content between 15% and 24%. The alkali metal silicate, particularly sodium silicate, potassium silicate or lithium silicate, is added to the phenolic resin in proportions typically of 1.0 to 5.0 parts per 100 parts by weight of phenolic resole resin. Such foams without the presence of alkali metal silicate modification have an aged thermal conductivity of >0.025 W/m·K and are typically >0.03 W/m·K.

Small pin holes in the foam cell walls of liquid or gaseous blown, (such as hydrocarbon blown), phenolic foam made from high water phenolic resin/acid systems, allow the blowing agent to transfer out of the foam, on ageing at elevated temperatures, for instance, 110° C. for 2 weeks. We have surprisingly found that the addition of sodium silicate, potassium silicate, or lithium silicate in liquid or solid form during the foam manufacturing process appears to result in a film thought to be a silica gel film being formed that covers a substantial number of the foam pin holes, thus retaining more blowing agent. Consequently an improved (lower) aged thermal conductivity (λ value) is achieved.

The invention provides a method for modifying a formulated phenolic resole resin including surfactant, blowing agent, acid catalyst and alkali metal silicate but excluding optional fillers with a water content between 15% and 24% by weight to produce closed cell foams with substantially no open holes in the cell walls enabling facile production of foam with low long term thermal conductivity using suitable blowing agents.

The viscosity of the resin is typically in the range of from 1000 to 12000 cPs, preferably 2000 to 9000 cPs at 25° C.

The invention provides a method for making a foam product with superior (low) thermal conductivity the method comprising forming the foam from a composition comprising:

a phenolic (resole) resin mixture including surfactant, (acid) catalyst, blowing agent and alkali metal silicate and optional fillers, the composition having a water content from about 15% to about 24% by weight of the composition, (where the water content is calculated based on the weight of the composition excluding any filler present) to produce a closed cell foam product.

Such a method allows for closed cells within the cell walls of the foam thus enabling facile production of foam with low long-term thermal conductivity using suitable blowing agents. It has been found that the foam product so formed is formed with substantially fewer defects such as holes in the cells and thus has significantly better (lower) thermal conductivity as compared to foam products made from similar compositions.

The invention also relates to a method of making a foam product, the method comprising providing a composition comprising:

a phenolic resin, catalyst, blowing agent, surfactant and alkali metal silicate and optional fillers, and curing the foam to produce a closed cell foam product having an aged thermal conductivity as determined by the procedures of EN13166:2008 of less than 0.025 W/m·K.

The invention also relates to the use of an alkali metal silicate as an additive to a phenolic foam resin composition to produce a closed cell foam product the closed cell foam product having an aged thermal conductivity as determined by the procedures of EN13166:2008 of less than 0.025 W/m·K.

The invention also provides a resin mixture for forming phenolic foam, the resin mixture including alkali metal silicate, particularly sodium, potassium or lithium silicate or combinations thereof. Further provided is a resin mixture for forming a phenolic foam, the resin mixture comprising a phenolic (resole) resin system that includes surfactant, (acid) catalyst, blowing agent and alkali silicate but excludes optional fillers with a water content in between 15% and 24% by weight.

The invention also relates to the use of an alkaline metal silicate as a film-forming additive in the production of a closed cell foam to form a film within closed cells of the foam.

The invention further relates to a method of making a closed cell foam product, the method comprising providing a composition comprising:

providing an alkali metal silicate in a resin mixture which can be cured to form a closed cell product in an amount sufficient to form a film within closed cells of the foam.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The words "comprises/comprising" and the words "having/including" when used herein with reference to the present invention are used to specify the presence of stated features, integers, steps or components but do not preclude the presence or addition of one or more other features, integers, steps, components or groups thereof.

BRIEF DESCRIPTION OF THE DRAWINGS

The invention will be more clearly understood from the following description of an embodiment thereof, given by way of example only, with reference to the accompanying Figures which are scanning electron micrographs of various described herein phenolic foam samples. The scanning electron microscopy (SEM) sample preparation technique is described in Appendix 1.

DETAILED DESCRIPTION OF THE INVENTION

Experimental Work

It is to be noted that some commercially available resins are formulated with surfactant already present.

Resin A Preparation

On a weight basis, Resin A was prepared by mixing under reflux 57.8 parts of phenol, 3.05 parts of water and 1.07 parts of 50% potassium hydroxide at 20° C. The temperature was raised to 74 to 76° C. and 30.4 parts of 91% paraformaldehyde was added over 2 hours. The temperature was then raised to 80 to 82° C. and held until viscosity reached was 6500 cP. Cooling was commenced whilst adding 3.3 parts of water, 4.1 parts of diethylene glycol and 3.6 parts of ethoxylated castor oil (surfactant). The final resin contained 17% water and 4% by weight of diethylene glycol as a plasticizer. The resin contained 8% free phenol, and less than 2% free formaldehyde. Viscosity was 2500 to 3500 cP at 25° C.

Resin B Preparation. (Distilled Resin A)

On a weight basis, Resin B was prepared by mixing under reflux 57.8 parts of phenol, 3.05 parts of water and 1.07 parts of 50% potassium hydroxide at 20° C. Temperature was raised to 74 to 76° C. and 30.4 parts of 91% paraformaldehyde was added over 2 hours. The temperature was raised to 80 to 82° C. and held until viscosity was 6500 cP. Cooling to 60° C. was commenced whilst adding 4.1 parts of diethylene glycol. 3.3 parts of water were vacuum distilled, cooling was continued to 40° C. and 3.6 parts of ethoxylated castor oil (surfactant) were then added. The final resin contained 11.5% water and 4.2% by weight of diethylene glycol as a plasticizer. The resin contained 7.3% free phenol, and 1.1% free formaldehyde. Viscosity was 7950 to 9000 cP at 25° C.

Examples of Foam Preparation

All Results are shown in Tables 1 and 2.

Examples 1 to 9 ("Ex1"-"Ex9") in Table 1 are all formulations which include alkali metal silicate. Comparative Example 1 is the same as Example 1 except that Comparative Example 1 does not include the silicate. Comparative Example 9 is the same as Example 9 except that Comparative Example 9 does not include the silicate.

When producing laboratory scale foam samples in the following examples and comparative examples, all chemical additions are carried out at room temperature (21° C.) unless stated.

The Examples in Table 1 show that stable low thermal conductivity foams that exhibit desirable aged thermal conductivity values after thermal ageing are produced when the total water content of the formulated phenolic resin mixture including, surfactant, acid and blowing agent but excluding optional fillers; is greater than 15% but less than 24%, provided an alkali silicate is also present at an appropriate concentration of between 1 and 10% by weight in the foam produced from the resin mixture.

The Examples in Table 2 show that even with an appropriate amount of alkali metal silicate present, of between 1 and 50% by weight of the foam, if the water content of the formulated phenolic resin system exceeds about 24% then thermal conductivity after thermal ageing drifts above 0.025 W/m·K. If water content in the resin system is too high, foams may not be strong enough to have sufficient structural integrity to stand freely and can collapse. Such collapsing foams are undesired. Example 1 "Ex1" is the same formulation as in Table 1. Comparative Examples 2-4 ("Comparative Ex2-Comparative Ex4") show the effect of increasing the overall water content of the resin mixture before it is activated to form the foam product. Comparative 4 resulted in a foam which collapsed and so is not suitable for use as a foam insulation product. Comparative Example 4 foam collapses because of high water content. Comparative Example 5 ("Comparative Ex5") reproduces the experimental work of GB135476 and shows that that foam has exceedingly high thermal conductivity and is unsuitable as a modern insulation material.

In ail the Examples and Comparative Examples shown in Tables 1 and 2, acid catalyst C is 65% by weight aqueous phenol sulphonic acid/phosphoric acid blended in a weight ratio of 4:1.

Blowing Agent E is 95% of 85/15 cyclopentane/isopentane and 5% perfluoroalkane blend by weight.

Blowing Agent F is a 60/40 isopropyl chloride/isopentane blend by weight.

Below are two methods of producing laboratory scale phenolic foams as used in Examples 1 to 9 and also for Comparative Examples 1 to 5 and 9.

The total water content and alkali metal silicates of the formulated resin systems and the thermal conductivities of the foam samples are recorded in Table 1 and Table 2.

Example 1 to 9 and Comparative Examples 2 to 4.—Foam Manufactured with the Addition of Alkali Metal Silicate to Phenolic Resin a or Resin B with Either Blowing Agent E or F Catalysed by Acid C Solid or aqueous alkali metal silicate at the appropriate concentration was added to 100 parts by weight of either Resin A or Resin B phenolic resin before the acid addition.

20 parts by weight of Acid C were mixed with the phenolic resin/silicate blend that had been pre-emulsified with the stated parts by weight of Blowing Agent E or F.

High speed mixing up to 3000 rpm was used. 260 g+/−10 g of the resulting mix was added to a picture frame mould of dimensions 300 mm×300 mm×50 mm at 70° C. for 20 minutes to cure and form 50 mm thickness rigid foam. The foam was dried at 70° C. in an oven. Drying time is 1 hour per 10 mm of cured foam thickness.

A flat foam sample 300×300×50 mm was produced for thermal conductivity determination.

Foam density was recorded using the procedures given in EN 1602.

Initial and aged λ values were measured using a Laser Comp heat flow meter at a mean temperature 23° C. The foam was thermally aged for an extended time period (in this case 2 weeks at 110° C.) following the procedures in European Standard EN 13166:2008 (or EN 14314:2009).

Comparative Examples 1 and 9.—Foam Manufactured without Addition of Alkali Metal Silicate to Phenolic Resin a with Either Blowing Agent E or F Catalysed by Acid C 20 parts by weight of Acid C were mixed with 100 parts by weight of Resin A phenolic resin that had been pre-emulsified with the stated parts by weight of Blowing Agent E or F.

High speed mixing up to 3000 rpm was used. 260 g+/−10 g of the resulting mix was added to a picture frame mould of dimensions 300 mm×300 mm×50 mm at 70° C. for 20 minutes to cure and form 50 mm thickness rigid foam. The foam was dried at 70° C. in an oven. Drying time is 1 hour per 10 mm of cured foam thickness.

A flat foam sample 300×300×50 mm was produced for thermal conductivity determination as above. Foam density was recorded following the procedures given in EN 1602.

When Examples 1 to 9 in Table 1 are compared to Comparative Examples 1 and 9, it is demonstrated that the addition of alkali metal silicate at 1 to 5 parts by weight of phenolic resole, leads to lower thermal conductivity (λ) in a composition in which the overall % water content of the foaming mixture excluding optional fillers is between 15 and 24%.

Table 2 reproduces the Example of GB 1351 476, in Comparative Example 5 where the alkali metal silicate content is 4.69% based on the weight of phenolic resole, acid, and blowing agent but excludes vermiculite filler. The % water content is 37.28% which is very detrimental to foam having low thermal conductivity. Therefore the foam system of GB 1351 476 whilst, having a similar amount of sodium silicate does not produce stable low thermal conductivity foams. The uncured composition is slurry-like and even upon being foamed and cured does not form a phenolic foam of a type that is suitable for forming a foam product which has a desirable closed cell structure and is sufficiently rigid, for example for a foam board, panel or c-section. So immediately its physical properties rule it out as a viable material. Even if it did have desirable physical properties then it fails to have a desirable thermal conductivity.

Comparative Examples 2, 3, and 4 contain similar alkali metal silicate content as used in GB 1351476 but have the benefit of lower % water content, than GB 1351476. However Comparative Examples 2, 3, and 4 still fail to achieve stable low thermal conductivity when aged. (It is an objective of the invention to achieve and aged thermal conductivity of <0.025 W/m·K.).

TABLE 1

|  | Comparative Ex 1 | Ex1 | Ex 2 | Ex3 | Ex 4 | Ex58 |
| --- | --- | --- | --- | --- | --- | --- |
| Resin A (17% water content) | 100 | 100 | 100 | 100 | 100 | 0 |
| Resin B (distilled to 11% water) | 0 | 0 | 0 | 0 | 0 | 100 |
| Added Water | 0 | 0 | 0 | 0 | 0 | 0 |
| Solid Anhydrous Sodium Silicate | 0 | 0 | 2.5 | 0 | 0 | 0 |
| Solid Sodium Silicate pentahydrate | 0 | 0 | 0 | 4.4 | 0 | 0 |
| 43% aqueous sodium silicate (solid alkali silicate) | 0 | 10 (4.3) | 0 | 0 | 0 | 0 |
| 35% aqueous potassium silicate (solid alkali silicate) | 0 | 0 | 0 | 0 | 12.6 (4.4) | 12.6 (4.4) |
| 52% aqueous potassium silicate (solid alkali silicate) | 0 | 0 | 0 | 0 | 0 | 0 |
| 23% aqueous lithium silicate (solid alkali silicate) | 0 | 0 | 0 | 0 | 0 | 0 |
| Blowing Agent E (85/15 cyclo-isopentane with 5 parts PF5052) | 6 | 6 | 6 | 6 | 6 | 6 |
| Blowing Agent F (60/40 ipC/iP) | 0 | 0 | 0 | 0 | 0 | 0 |
| Catalyst C (PSA/PA (4:1) acid) | 20 | 20 | 20 | 20 | 20 | 20 |
| % Total Water Content | 19.05 | 21.8 | 18.7 | 18.4 | 23.2 | 18.9 |
| % Solid Alkali Silicate Content | 0 | 3.16 | 1.94 | 3.37 | 3.17 | 3.17 |
| Dry Density (kg/m3) | 49.5 | 40.8 | 46.6 | 40.7 | 39.6 | 40.5 |
| Initial lambda (W/mK) at 23 C. mean temp | 0.0263 | 0.0227 | 0.0201 | 0.0214 | 0.0223 | 0.0217 |

TABLE 1-continued

|  | | | | | |
|---|---|---|---|---|---|
| 2 weeks at 110° C. Aged lambda (W/mK) | 0.0400 | 0.0243 | 0.0232 | 0.0242 | 0.0249 | 0.0239 |

|  | Ex 6 | Ex7 | Ex 8 | Ex9 | Comparative Ex 9 |
|---|---|---|---|---|---|
| Resin A (17% water content) | 0 | 100 | 0 | 100 | 100 |
| Resin B (distilled to 11% water) | 100 | 0 | 100 | 0 | 0 |
| Added Water | 0 | 0 | 0 | 0 | 0 |
| Solid Anhydrous Sodium Silicate | 0 | 0 | 0 | 0 | 0 |
| Solid Sodium Silicate pentahydrate | 0 | 0 | 0 | 0 | 0 |
| 43% aqueous sodium silicate (solid alkali silicate) | 0 | 0 | 0 | 10 (4.3) | 0 |
| 35% aqueous potassium silicate (solid alkali silicate) | 0 | 0 | 0 | 0 | 0 |
| 52% aqueous potassium silicate (solid alkali silicate) | 8.5 (4.4) | 8.5 (4.4) | 0 | 0 | 0 |
| 23% aqueous lithium silicate (solid alkali silicate) | 0 | 0 | 13.9 (3.2) | 0 | 0 |
| Blowing Agent E (85/15 cyclo-isopentane with 5 parts PF5052) | 6 | 6 | 6 | 0 | 0 |
| Blowing Agent F (60/40 IpC/IP) | 0 | 0 | 0 | 6.8 | 6.8 |
| Catalyst C (PSA/PA (4:1) acid) | 20 | 20 | 20 | 20 | 20 |
| % Total Water Content | 16.4 | 20.8 | 20.5 | 21.7 | 18.9 |
| % Solid Alkali Silicate Content | 3.27 | 3.27 | 2.29 | 3.14 | 0 |
| Dry Density (kg/m3) | 42.1 | 42.5 | 41.1 | 42.3 | 39 |
| Initial lambda (W/mK) at 23 C. mean temp | 0.0209 | 0.0232 | 0.0219 | 0.0217 | 0.0261 |
| 2 weeks at 110° C. Aged lambda (W/mK) | 0.0236 | 0.0243 | 0.0247 | 0.0249 | 0.0327 |

TABLE 2

|  | Ex1 | Comparative Ex2 | Comparative Ex3 | Comparative Ex4 | Comparative Ex 5 (GB 1351476 |
|---|---|---|---|---|---|
| Phenolic Resin GB 1351476 (28.5% water content) | 0 | 0 | 0 | 0 | 100 |
| Resin A (17% water content) | 100 | 100 | 100 | 100 | 0 |
| Added Water | 0 | 5.5 | 11.3 | 0 | 0 |
| GB 1351476 47.5% aqueous sodium silicate (solid sodium waterglass) | 0 | 0 | 0 | 0 | 20 (9.5) |
| 43% aqueous sodium silicate (solid alkali silicate) | 10 (4.3) | 10 (4.3) | 10 (4.3) | 32.6 (14.0) | 0 |
| Blowing Agent E (85/15 cyclo-isopentane with 5 parts PF5052) | 6 | 6 | 6 | 6 | 0 |
| GB 1351476 Blowing Agent pentane | 0 | 0 | 0 | 0 | 7.5 |
| Catalyst C (PSA/PA (4:1) acid) | 20 | 20 | 20 | 20 | 0 |
| GB 1351476 Catalyst (50% TSA) | 0 | 0 | 0 | 0 | 75 |
| % Total Water Content | 21.8 | 24.9 | 27.8 | 26.8 | 37.28 |
| % Solid Alkali Silicate Content | 3.16 | 3.04 | 2.91 | 8.8 | 4.69 |
| Initial lambda (W/mK) at 23 C. mean temp | 0.0227 | 0.0235 | 0.0242 | * | 0.0543 |
| 2 weeks at 110° C. Aged lambda (W/mK) | 0.0243 | 0.0253 | 0.0270 | * | Unsuitable for insulation |

* In Comparative Ex 4, the foam collapsed as it is too unreactive.
In the foam of Comparative Ex 5 for GB 1351476, the filler was included in the Comparative Ex 5 example formulation to make a direct comparison with GB 1351476. However, the presence of the filler was excluded from the calculated values for % Total Water Content and % Solid Alkali Silicate Content. In this case the foam had very high thermal conductivity.

The invention is not limited to the embodiments hereinbefore described which may be varied in detail.

APPENDIX 1

Scanning Electron Microscopy Sample Preparation.

A 20 mm×10 mm piece of phenolic foam was cut from the sample. From this piece, the surfaces were trimmed with a razor blade to approximately 8 mm square. The foam was then snapped by hand to expose a clean surface in the rising foam direction. The majority of this sample was removed to leave a thin 1 mm slice of the foam in the rise direction.

It is possible that manual snapping of the foam sample to create a surface to examine can induce some minor damage of the foam cells.

This slice of foam was fixed on to an aluminium sample stub using a double-sided conducting sticky tab.

The sample, (or samples), were then given a thin (approximately 2.5 Angstroms) conducting coat of gold/palladium using a Biorad SC500 sputter coater. The reason for coating the samples is (a) to add a conducting surface to carry electron charge away and (b) to increase the density to give a more intense image. At the magnifications involved in this study the effect of the coating is negligible.

The samples were imaged using an FEI XL30 ESEM FEG Scanning Electron Microscope under the following conditions, 10 kV accelerating voltage, working distance approximately 10 mm. Images were examined at ×1200 to ×20000 magnification. The differing magnifications allow cell size distribution and defects present on the foam cells.

Figure 1:
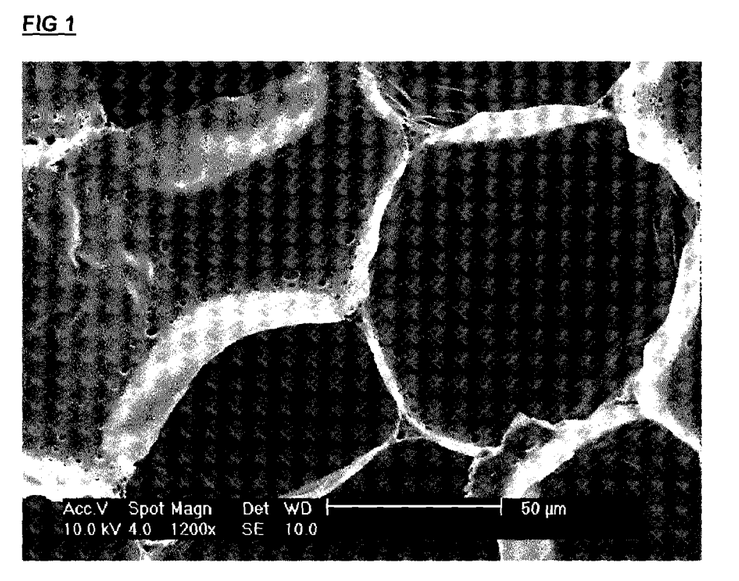
FIG. 1 is a scanning electron micrograph of the foam of Comparative Example 1 showing that high water phenolic foam cell structure has many pin holes. The formulated phenolic resin, blowing agent and acid catalyst do not contain alkali metal silicate and have a combined water content of 19.05%.
Figure 2:
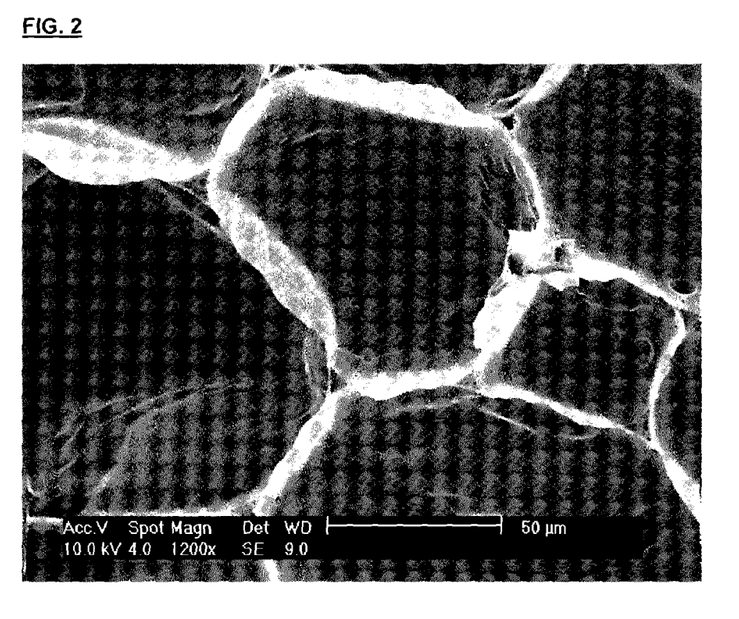
FIG. 2 is a scanning electron micrograph of the foam of Example 1 showing silica gel covered pin holes despite a higher water content, 21.8% for the phenolic resin, blowing agent and acid catalyst but with sodium silicate added which serves to protect the cells.
Figure 3:
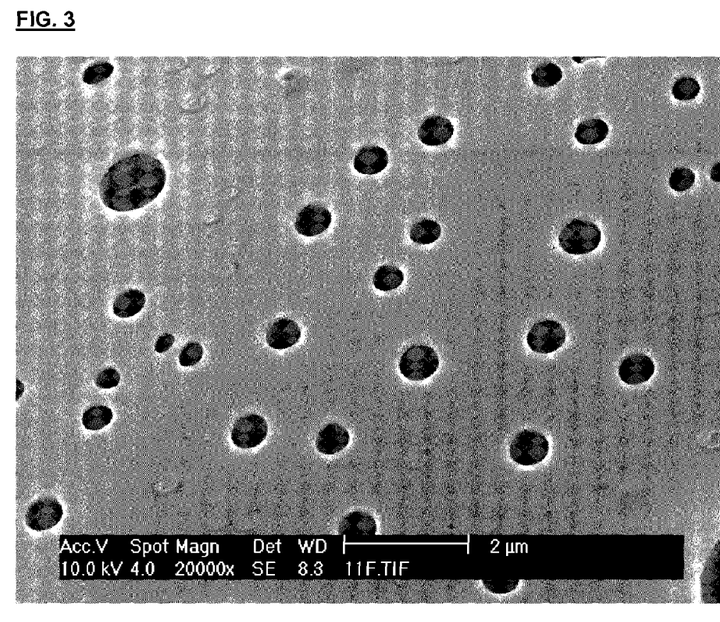
FIG. 3 is a scanning electron micrograph of the foam of Comparative Example 1 showing high resolution of cellular pin holes.
Figure 4:
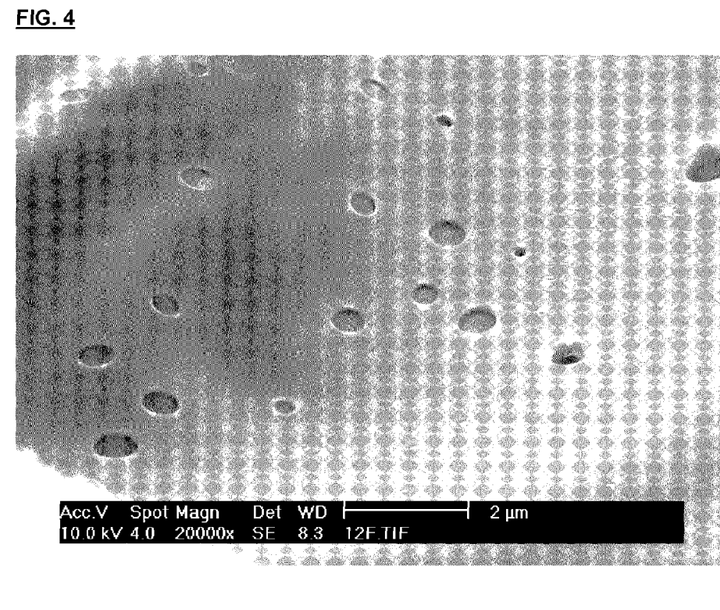
FIG. 4 is a scanning electron micrograph of foam of Example 3 showing high resolution of silica gel covered cellular pin holes.

Scanning Electron Microscope (SEM) photographs are shown in FIGS. 1 to 4 for Example 1, Example 3 and Comparative Example 1.

SEM 1 (FIG. 1) and SEM 3 (FIG. 3)—These photographs shows phenolic foam made in Comparative Example 1. A substantial number of pinholes in the cell walls can be seen.

SEM 2 (FIG. 2)—This photograph shows phenolic foam from Example 1. The pinholes in the cell walls appear to be fewer and largely covered with a film as a result of the sodium silicate-addition which may be due to silica gel formation.

SEM 4 (FIG. 4) shows Example 3 with 4.4 parts sodium silicate pentahydrate. The pinholes in the cell walls are largely covered with a film which may be due to silica gel formation.

The invention claimed is:

1. A phenolic foam formed from a phenolic resole resin mixture comprising a phenolic resole resin, a surfactant, a blowing agent and an alkali metal silicate wherein the alkali metal silicate is added into the phenolic resin with a subsequent addition of an acid catalyst, the alkali metal silicate being present in an amount of at least 1% by weight, the phenolic resole resin mixture excluding optional fillers having a water content of from about 12% to about 24% by weight of the composition, the foam having a silica film formed within closed cells of the foam and thereby retain the blowing agent therein, the foam having an aged thermal conductivity as determined by the procedures of EN13166:2008 or EN14314:2009 of less than 0.025 W/m·K.

2. The foam as claimed in claim 1 wherein the alkali metal silicate is present in an amount of from 1% to 10% by weight of the phenolic foam.

3. The foam as claimed in claim 1 wherein the alkali metal silicate is present in an amount of from 2.5% to 5% by weight of the phenolic foam.

4. The foam as claimed in claim 1 wherein the alkali metal silicate is hydrated and has the formula $A_2SiO_3 \cdot nH_2O$ in which A is an alkali metal from Group 1 of the Periodic Table and n is an integer from 1 to 9.

5. The foam as claimed in claim 1 wherein the alkali metal silicate is selected from sodium silicate, potassium silicate and lithium silicate or mixtures thereof.

6. The foam as claimed in claim 1 wherein the silicate is sodium silicate pentahydrate.

7. The foam as claimed in claim 1 wherein the silicate is potassium silicate.

8. The foam as claimed in claim 1 wherein the silicate is lithium silicate.

9. The foam as claimed in claim 1 wherein the blowing agent is a hydrocarbon blowing agent.

10. The foam as claimed in claim 9 wherein the hydrocarbon comprises a mixture of cyclopentane and isopentane.

11. The foam as claimed in claim 9 wherein the blowing agent comprises a mixture of isopropyl chloride and isopentane.

12. The foam as claimed in claim 1 wherein the blowing agent comprises perfluoroalkane.

13. The foam as claimed claim 1 wherein the foam is formed from a phenolic resole resin mixture having a water content of greater than 15% by weight but less than 24% by weight and the alkali metal silicate is present in an amount of at least 1% by weight of the foam.

14. The foam as claimed in claim 13 wherein the alkali metal silicate is present in the phenolic resole resin mixture excluding fillers in an amount of from 1% to 10% by weight of the foam.

15. The foam as claimed in claim 13 wherein the alkali metal silicate is present in the resole resin mixture (excluding fillers) in an amount of from 2.5% to 5% by weight of the foam.

16. A method of making a foam product the method comprising forming the foam from a composition comprising:
 a phenolic resin including surfactant, acid catalyst, blowing agent and alkali metal silicate and optional fillers, wherein the alkali metal silicate is added to the phenolic resin, and emulsified with blowing agent, prior to the addition of the acid catalyst,
 the composition excluding optional fillers having a water content of from about 12% to about 24% by weight of the composition,
 to produce a closed cell foam product a silica film within the closed cells of the foam, the foam having an aged thermal conductivity as determined by the procedures of EN13166:2008 or EN14314:2009 of less than 0.025 W/m·K.

17. The foam as claimed in claim 1, wherein the foam is formed from a phenolic resin mixture having a water content of from about 15% by weight to about 24% by weight of the resin mixture.

18. The foams as claimed in claim 9, wherein the hydrocarbon comprises at least one pentane.

19. A method of making a phenolic foam product, the method comprising forming the foam by mixing an alkali metal silicate with a phenolic resin including a surfactant, prior to a subsequent acid catalyst addition, said phenolic resin having a water content of from 12% by weight to 24% by weight, emulsifying the mixture formed therefrom with blowing agent, and subsequently adding acid to cure the resultant mixture.

* * * * *

UNITED STATES PATENT AND TRADEMARK OFFICE
CERTIFICATE OF CORRECTION

| | |
|---|---|
| PATENT NO. | : 9,896,559 B2 |
| APPLICATION NO. | : 14/429044 |
| DATED | : February 20, 2018 |
| INVENTOR(S) | : Malcolm Rochefort et al. |

It is certified that error appears in the above-identified patent and that said Letters Patent is hereby corrected as shown below:

On the Title Page

Item [71], Applicant:
After "Kingscourt", insert --, Co. Cavan--.

In the Specification

Column 1
Line 1 after "FOAM", insert
--¶INTRODUCTION
The invention relates to phenolic foam.--.

Column 3
Line 22 "resultant," should be --resultant--.
Line 56 "amount," should be --amount--.

Column 4
Line 16 "hoard," should be --board,--.
Line 39 "system," should be --system.--.

Column 5
Line 4 "weight," should be --weight--.

Column 8
Line 32 "24%," should --24%--.
Line 38 "50%" should be --10%--.
Line 57 "ail" should be --all--.

Signed and Sealed this
Third Day of July, 2018

Andrei Iancu
*Director of the United States Patent and Trademark Office*

CERTIFICATE OF CORRECTION (continued)
U.S. Pat. No. 9,896,559 B2

<u>Column 9</u>
Line 7 "a" should be --A--.
Line 33 after "without", insert --the--.
Line 34 "a" should be --A--.

<u>Column 10</u>
Line 24 "whilst," should be --whilst--.
Line 36 "content," should be --content--.

<u>Column 13</u>
Lines 2-3 "conditions," should be --conditions.--.